United States Patent
Wang et al.

(10) Patent No.: US 8,000,655 B2
(45) Date of Patent: Aug. 16, 2011

(54) UPLINK MULTI-CELL SIGNAL PROCESSING FOR INTERFERENCE SUPPRESSION

(75) Inventors: Yi-Pin Eric Wang, Cary, NC (US);
Gregory E. Bottomley, Cary, NC (US);
Fredrik Gunnarsson, Linköping (SE);
Niclas Wiberg, Linköping (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 459 days.

(21) Appl. No.: 12/339,967

(22) Filed: Dec. 19, 2008

(65) Prior Publication Data

US 2010/0159838 A1    Jun. 24, 2010

(51) Int. Cl.
*H04B 1/00* (2006.01)
(52) U.S. Cl. .................. 455/63.1; 370/208; 375/149
(58) Field of Classification Search ........... 455/562.1, 455/67.11, 63.1, 442; 342/81, 276.1, 368; 343/853, 890; 370/208, 335; 375/130, 144, 375/147, 148, 149, E1.032, E1.031, E1.02
See application file for complete search history.

(56) References Cited

U.S. PATENT DOCUMENTS

| | | | |
|---|---|---|---|
| 6,363,104 B1 | 3/2002 | Bottomley | |
| 6,714,585 B1 | 3/2004 | Wang | |
| 7,242,362 B2 * | 7/2007 | Hulkkonen et al. | 343/853 |
| 7,664,533 B2 * | 2/2010 | Logothetis et al. | 455/562.1 |
| 7,881,412 B2 * | 2/2011 | Banister | 375/346 |
| 2004/0228305 A1 | 11/2004 | Grieco | |
| 2005/0095985 A1 * | 5/2005 | Hafeoz | 455/67.11 |
| 2007/0248052 A1 | 10/2007 | Nagaraj et al. | |
| 2008/0130714 A1 * | 6/2008 | Wilborn et al. | 375/144 |
| 2008/0219325 A1 | 9/2008 | Sambhwani | |
| 2008/0304554 A1 | 12/2008 | Fulghum | |

FOREIGN PATENT DOCUMENTS

WO    2008/057406    6/2008

OTHER PUBLICATIONS

G. Bottomley, T. Ottosson, and Y.-P. E. Wang, "A generalized RAKE receiver for interference suppression,", *IEEE J. Select. Areas Commun.*, vol. 18, pp. 1536-1545, Aug. 2000.

* cited by examiner

*Primary Examiner* — Lam T Mai (57) ABSTRACT

A node (e.g., base station, signal processing unit) is described herein that includes a symbol detector and a method which are capable of suppressing interference caused by one user device (which may be in softer handoff mode) to reduce performance degradation to other intra-cell user devices and/or other inter-cell user devices (which may not be in softer handoff mode).

20 Claims, 5 Drawing Sheets

UPLINK MULTI-CELL SIGNAL PROCESSING FOR INTERFERENCE SUPPRESSION

TECHNICAL FIELD

The present invention relates in general to the wireless telecommunications field and, in particular, to a node (e.g., base station or a signal processing unit) that includes a symbol detector and method for suppressing interference from one user device to reduce performance degradation to other intra-cell user devices and/or other inter-cell user devices.

BACKGROUND

Figure 1:
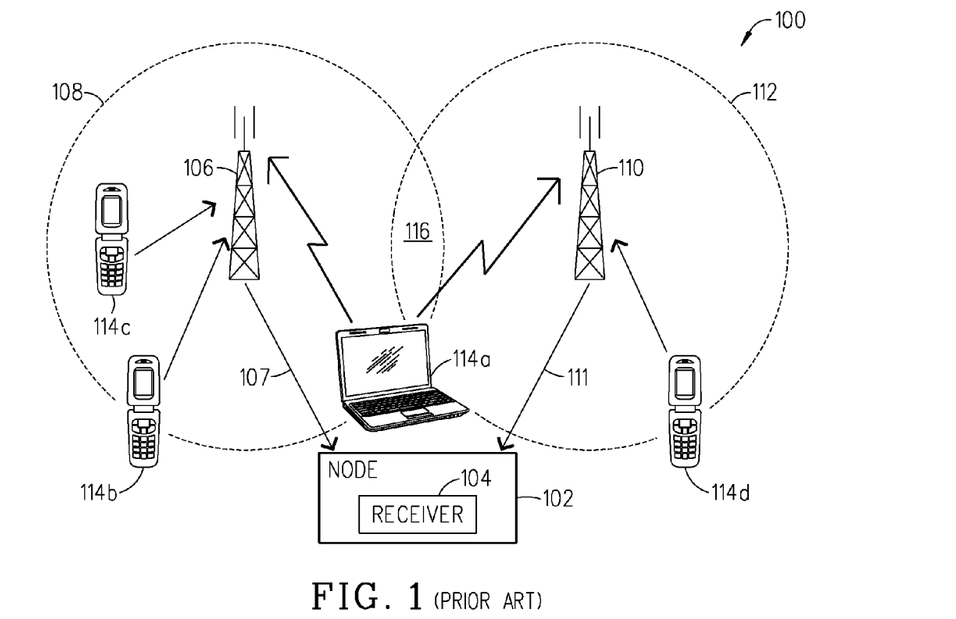
FIG. 1 (PRIOR ART) is a basic diagram of a traditional wireless communications system which is used to help explain an interference problem that is solved by the present invention.

Referring to FIG. 1 (PRIOR ART), there is a basic diagram of a wireless communications system 100 including a node 102 (e.g., base station 102, signal processing unit 102) that has a receiver 104 coupled to at least one receive antenna 106 which covers a first sector 108 and at least one receive antenna 110 which covers a second sector 112. The receive antennas 106 and 110 are typically co-located on the same base station tower or site but oriented in different directions. However, in this case the receive antennas 106 and 110 are part of a distributed antenna system and as such are not co-located but respectively receives composite received signals 107 and 111 which are processed by the central node 102. In this example, three user devices 114a, 114b and 114c are shown located in the first sector 108 and one user device 114d is located in the second sector 112. Today, when the first user device 114a is located at or near a border 116 between the first and second sectors 108 and 112 it may cause interference to fellow-cell user devices such as the user devices 114b and 114c in addition to other-cell user devices such as the user device 114d. For instance, in a Wideband Code-Division Multiple Access (WCDMA) wireless communication system 100 today there is an enhanced uplink which allows the user device 114a (for example) to transmit up to 11 Mbps. The high-rate user device 114a may cause intra-cell interference to user devices 114b and 114c and inter-cell interference to user device 114d. In fact, the inter-cell interference could be quite pronounced when the high-rate user device 114a is located at the sector border 116. This interference problem and other problems are addressed by a node (which includes a symbol detector) and method of the present invention.

SUMMARY

In one aspect, the present invention provides a node (e.g., base station, signal processing unit) adapted to suppress interference between user devices by having a symbol detector that comprises: (a) a receiver coupled to at least one receive antenna which covers a first sector and at least one receive antenna which covers a second sector; and (b) a signal processor that: (i) processes composite receive signals received by the at least one receive antenna which covers the first sector and the at least one receive antenna which covers the second sector, where the composite receive signals include a first user signal transmitted from a first user device and a second user signal transmitted from a second user device; (ii) determines if the first user signal causes interference to the second user signal received in either or both of the first sector and the second sector; and (iii) if the first user signal does cause interference to the second user signal, then the second user signal is recovered by processing the composite signals to form symbol estimates. The node effectively suppresses interference caused by the first user device which may be located near a border between the two sectors to reduce degradation to the reception of uplink signals from the second user device which may be located in either one of the two sectors.

In another aspect, the present invention provides a method for suppressing interference, the method including the steps of: (a) processing composite receive signals which are received by at least one receive antenna which covers a first sector and at least one receive antenna which covers a second sector, where the composite receive signals include a first user signal transmitted from a first user device and a second user signal transmitted from a second user device; (b) determining if the first user signal causes interference to the second user signal received in either or both of the first sector and the second sector; and (c) if the first user signal does cause interference to the second user signal, then recovering the second user signal by processing the composite signals to form symbol estimates. The method effectively suppresses interference caused by the first user device, which may be located near a border between the two sectors, to reduce degradation to the reception of uplink signals from the second user device, which may be located in either one of the two sectors.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings.

DETAILED DESCRIPTION

In the following detailed description, for purposes of explanation and not limitation, an exemplary node (e.g., base station, signal processing unit) and in particular an exemplary symbol detector located therein are set forth to provide a thorough understanding of the present invention. However, it will be apparent to one with ordinary skill in the art and having had the benefit of the present disclosure, that the present invention may be practiced in other embodiments which depart from the specific details disclosed herein. Moreover, descriptions of well-known devices, methods and materials have been omitted so as not to obscure the description of the present invention. Finally, wherever applicable, like reference numerals refer to like elements herein.

Figure 2:
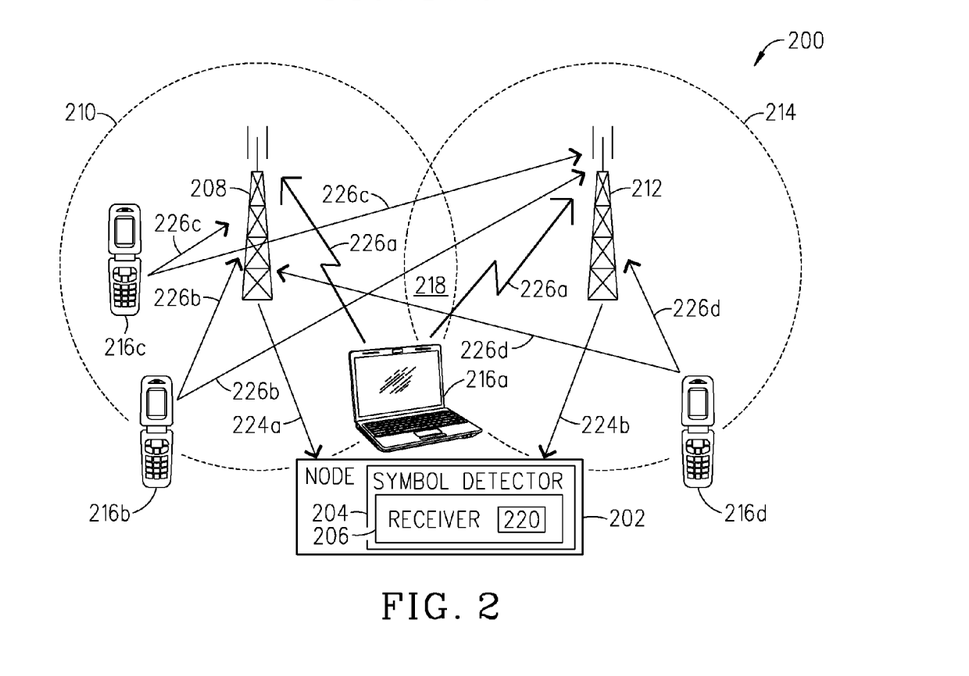
FIG. 2 is a basic diagram of a wireless communications system with a node (e.g., base station, signal processing unit) which includes a symbol detector that suppresses interference caused by one interfering user device to reduce degradation to the reception of uplink signals from other intra-cell user devices and/or other inter-cell user devices in accordance with an embodiment of the present invention.

Referring to FIG. 2, there is a basic diagram of a wireless communications system 200 with a node 202 (e.g., base station 202, signal processing unit 202) including a symbol detector 204 that suppresses interference caused by one user device 216a from affecting other intra-cell user devices 216b and 216c and/or other inter-cell user devices 216d in accordance with an embodiment of the present invention. The symbol detector 204 has a receiver 206 coupled to at least one receive antenna 208 which covers a first sector 210 and at least one receive antenna 212 which covers a second sector 214. In this example, three user devices 216a, 216b and 216c are located in the first sector 210 and one user device 216d is located in the second sector 214. Plus, the user device 216a is located at a border 218 between the first and second sectors 210 and 214. The symbol detector 204 also includes one or more signal processors 220 (which may be part of the receiver 206) that is/are adapted to: (a) process composite receive signals 224a and 224b received by the receive antennas 208 and 212 respectively, where the composite receive signals 224a and 224b each include a user signal 226a transmitted from the user device 216a and one or more user signals 226b, 226c and 226d respectively transmitted from one or more user devices 216b, 216c and 216d (step 1); (b) determine if the user signal 226a causes interference to at least one of the user signals 226b, 226c and 226d which is received in either or both the first sector 210 and the second sector 214 (step 2); and (c) if yes, then the at least one interfered user signals 226b, 226c and 226d is recovered by processing the composite receive signals 224a and 224b received by the receive antennas 208 and 212 to form symbol estimates (step 3).

In one example, the processing of composite signals 224a and 224b to form symbol estimates can be done by using a softer combining technique that effectively suppresses the interference caused by the user signal 226a (associated with the user device 216a) from affecting the user signals 226b, 226c, and/or 226d (associated with the intra-cell user devices 216b, 216c and/or the inter-cell user device 216d). In this example, the first user device 216a would typically be operating in a soft or softer handoff mode because it is located at the sector border 218 between the first and second sectors 210 and 214. In the uplink of CDMA, "soft handoff" means that the composite signal 224a picked up by sector antenna 208 and the composite signal 224b picked up by antenna 212 are processed independently to form separate system estimates and "softer handoff" means that the composite signals 224a and 224b are jointly processed, and in most cases jointly combined after despreading to form a symbol estimate. The first user device 216a while in this position is assumed in this example to transmit an uplink signal 226a which causes interference to the other user devices 216b, 216c and 216d which are located in both the first and second sectors 210 and 214. The other user devices 216b, 216c and 216d may be located away from the sector border 218 and as such would not typically be operating in the softer handoff mode. However, the received user signal 226b, 226c and 226d from these user devices 216b, 216c and 216d would benefit significantly from the use of a symbol detector 204 which implements a softer combining technique like chip equalization or G-Rake (Generalized Rake) across antennas (e.g., antennas 208 and 212) covering different sectors in accordance with the present invention. G-Rake as will be discussed in detail below basically exploits the temporal and spatial correlation properties of the high-data-rate interfering first user signal 226a to suppress the interference to the other user signals 226b, 226c and 226d. In the discussion below, the term G-Rake4 is used to represent a softer combining scheme which uses G-Rake combining weights to combine signals received from four receive antennas. Alternatively, chip equalization could also be used in which baseband samples or baseband values are combined prior to despreading. Also, other softer handoff combining techniques are possible, including nonlinear approaches such as decision feedback equalization (DFE), maximum-likelihood sequence estimation (MLSE), and turbo equalization.

Figure 3A:
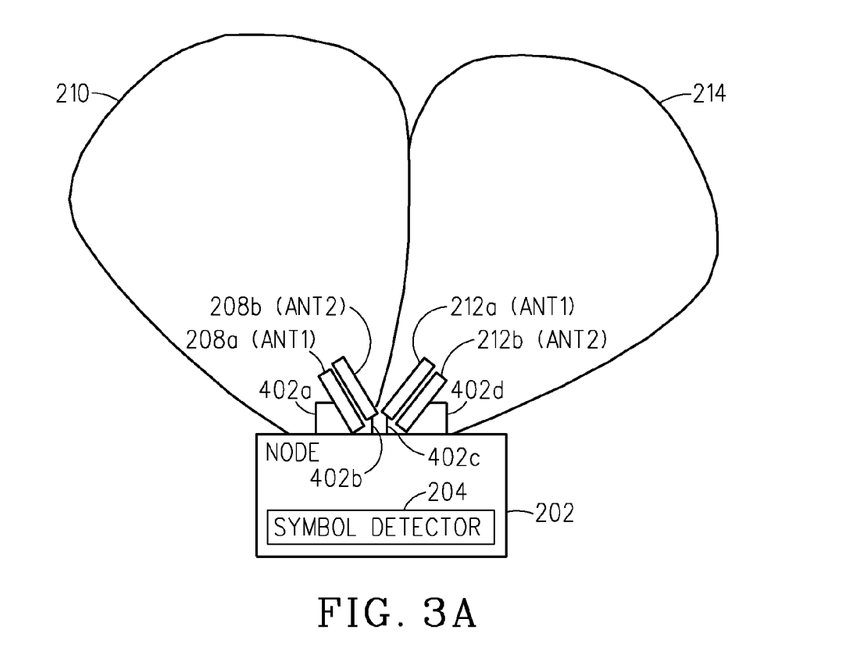
FIGS. 3A-3B are diagrams illustrating two different exemplary configurations of the node (e.g., base station, signal processing unit) shown in FIG. 2 in accordance with an embodiment of the present invention.
Figure 3B:
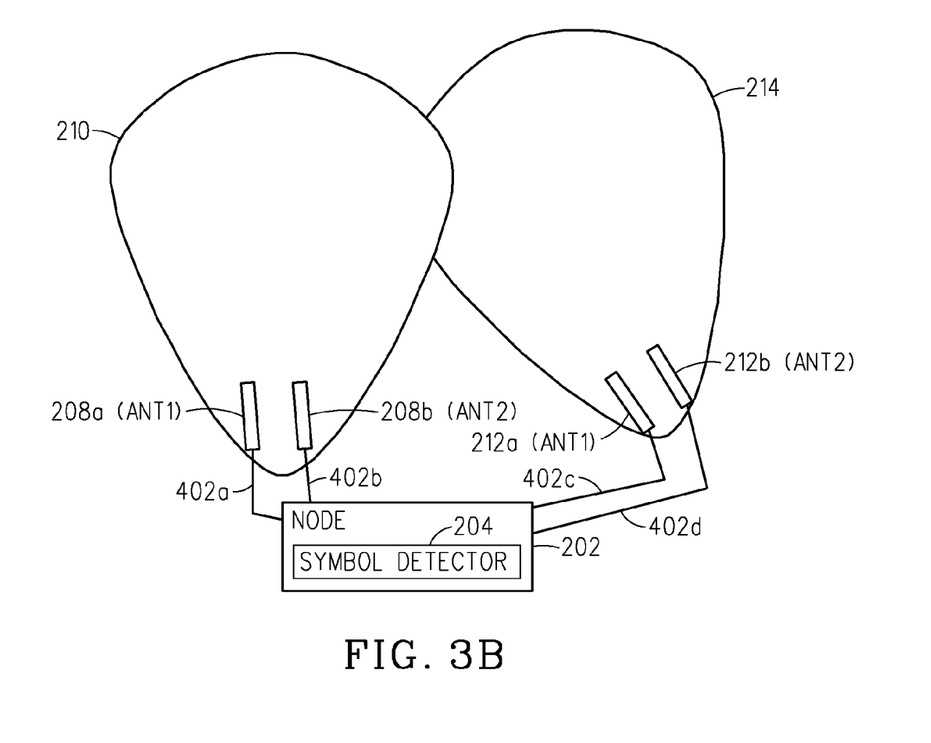

G-Rake4 can be enabled if the node 202 (e.g., base station 202) is equipped with a receiver 206 that receives signals from at least two receive antennas 208a and 208b at the first sector 210 and at least two receive antennas 212a and 212b at the second sector 214. One example of such a base station 202 which has a number of sectors 210 and 214 where the first sector 210 has two receive antennas 208a and 208b (ant 1 and ant 2) and the second sector 214 has two receive antennas 212a and 212b (ant 1 and ant 2) has been illustrated in FIG. 3A. Another example is illustrated in FIG. 3B, where the base station 202 is connected to receive antennas 208a, 208b, 212a and 212b where the two receive antennas 208a and 208b (ant 1 and ant 2) associated with the first sector 210 and are deployed at different locations or sites than the two receive antennas 212a and 212b (ant 1 and ant 2) associated with the second sector 214. The last configuration is sometimes popularized as the 'main-remote concept' or the 'fiber to the antenna concept' or 'distributed antenna system'. Regardless of whether the multiple antennas 208a, 208b, 212a and 212b are at the same or different locations, the base station 202 of the present invention is coupled to all of these antennas 208a, 208b, 212a and 212b.

Thus, according to one embodiment of the present invention, when the base station 202 detects there is a strong interfering signal 226a from a user device 216a in softer handoff, then the base station 202 would put user devices 216b, 216c and 216d and their respective user signals 226b, 226c and 226d received in the associated sectors 210 and 214 in softer combining mode and use G-Rake combining weights to combine the despread values collected from antennas 208a, 208b, 212a and 212b associated with the sectors 210 and 214. Traditionally, user devices 216b, 216c and 216d would only be put in softer handoff if their signals were received strongly in sectors 210 and 214. However, in the present invention a second reason is used for putting user devices 216b, 216c and 216d in softer handoff. An example of how the base station 202 and in particular the symbol detector 204 incorporated therein can accomplish this is discussed in detail below with respect to FIGS. 4-7. However, prior to discussing the exemplary symbol detector 204, it should be appreciated that the present invention can be generalized beyond softer handoff. As such, the concept of a base station 202 in this setting essentially means a node that processes signals from antennas 208 and 212 which are associated with one or several sectors 210 and 214 (cells 210 and 214). Also, the present invention can be implemented with multiple interfering user devices (multiple user devices 214a) and multiple intra-cell user devices and/or multiple inter-cell user devices.

Figure 4:
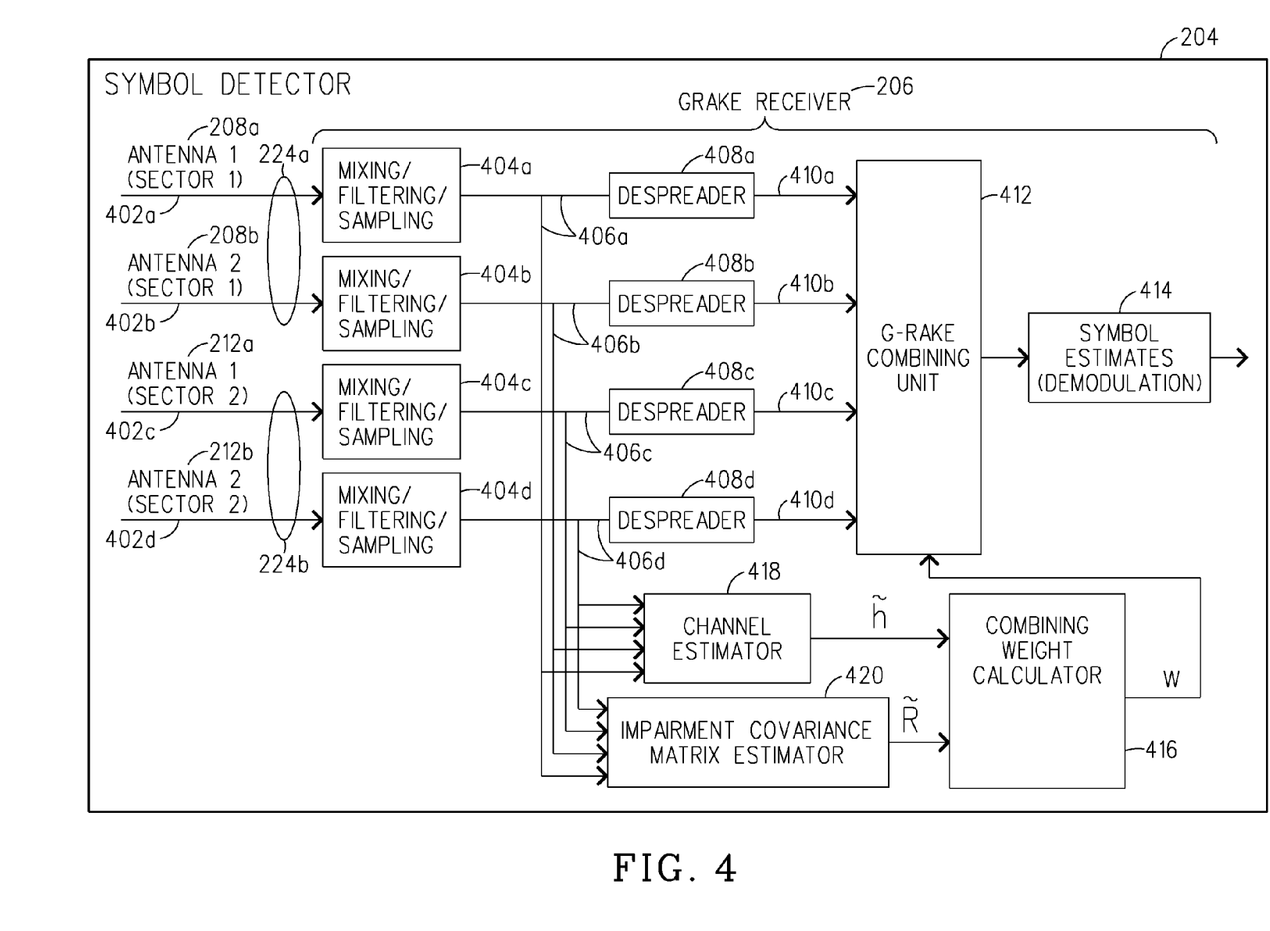
FIGS. 4-7 are diagrams illustrating in greater detail the basic components of the symbol detector shown in FIG. 2 in accordance with an embodiment of the present invention.
Figure 5:
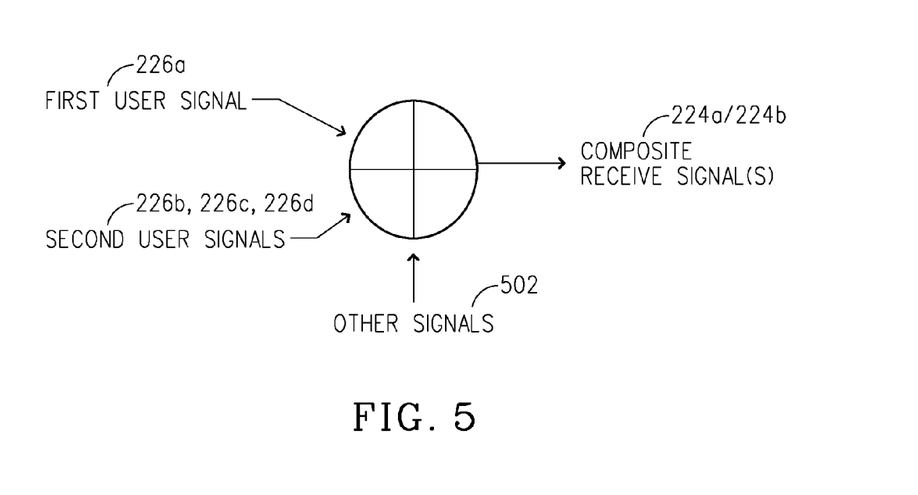

Referring to FIGS. 4-7, there are diagrams illustrating in greater detail the basic components of an exemplary symbol detector 204 in accordance with an embodiment of the present invention. As shown in FIG. 4, the symbol detector 204 has a G-Rake receiver 206 which is coupled to a number of receive antennas 208a, 208b, 212a and 212b which respectively receive signals 402a, 402b, 402c and 402d that make-up the composite signals 224a and 224b (see also FIGS. 3A-3B). In one example, each received signal 402a and 402b (composite signal 224a) and each received signal 402c, and 402d (composite signal 224b) includes a received copy of first user signal 226a transmitted by the user device 216a (e.g., by a high-data-rate user device 216a), and received copies of second user signals 226b, 226c and 226d which are transmitted by user devices 216b, 216c and 216d (e.g., by voice user devices 216b, 216c and 216d), and other signals 502 which include signals from other users, noise, and interference (see FIG. 5). The G-Rake receiver 206 also has a number of mixing/filtering/sampling units 404a, 404b, 404c and 404d that convert the respective signals 402a, 402b, 402c and 402d (which make up the composite signals 224a and 224b) to baseband samples 406a, 406b, 406c and 406d. The G-Rake receiver 206 uses desperado units 408a, 408b, 408c and 408d and a spreading sequence associated with a symbol of interest to despread the respective antenna baseband samples 406a, 406b, 406c and 406d (note: each despreader unit 408a, 408b, 408c, or 408d may consist of multiple fingers each of which corresponds to a particular finger delay). The multiple despread values 410a, 410b, 410c and 410d are combined in a G-Rake combining unit 412 which uses a set of combining weights w to produce a symbol estimate 414 (demodulated symbol 414). As shown, the G-Rake combining unit 412 receives the combining weights w from a combining weight calculator 416. The combining weight calculator 416 calculates the combining weights w by using a net response h and an impairment covariance R. In this example, the net response h is provided by a channel estimator 418 which processes the baseband samples 406a, 406b, 406c and 406d. The impairment covariance R is provided by an impairment covariance matrix estimator 420 which processes the baseband samples 406a, 406b, 406c and 406d.

The G-Rake receiver 206 suppresses the interference caused by the user device 216a (for example) and affecting the symbol of interest by formulating the combining weights w to account for the temporal and spatial correlations of the interference as follows:

$$w = R^{-1}h,$$

where w is the combining weights, h is the net response and R is the impairment covariance. White noise often results in an identity impairment covariance matrix, R. In such cases, the combining weights reduce to w=h, and thus G-Rake becomes Rake, which is optimal in white noise. However, interference in Code-Division Multiple Access (CDMA) (for example) is likely to be colored as a signal 226a, 226b, 226c or 226d travels through a frequency-selective (non-white) channel, i.e. the received signal 226a, 226b, 226c or 226d is colored by the frequency-selective channel. When the noise is colored, then there is a spatial/temporal correlation between the received signal 226a, 226b, 226c or 226d and noise and this correlation can be exploited for interference suppression in accordance with the present invention when designing the combining weights w so as to suppress the undesirable noise. A detailed discussion about one way that this can be accomplished is described next.

The G-Rake receiver 206 can perform the interference suppression by formulating an impairment covariance matrix R to account for the spatial/temporal correlation across antennas 208a, 208b, 208c and 208d associated with multiple sectors 210 and 214 due to the dominant interferer(s). For example, the impairment covariance matrix R can account for a contribution due to self interference $R_S$, and that from an other-user interference $R_I$ as follows:

$$R = R_S + R_I,$$

where in the present example $R_S$ would be associated with one of the user terminals 216b, 216c or 216d, and $R_I$ would be associated with user terminal 216a. By including $R_I$ in R, G-Rake can suppress the user interference caused by the signal 226a of user terminal 216a. In one embodiment, the impairment covariance matrix R can be estimated using an unused code approach that is described in co-assigned U.S. patent application Ser. No. 12/135,268, filed Jun. 9, 2008, and entitled "Method and Apparatus for Estimating Impairment Covariance Matrices using Unoccupied Spreading Codes" (the contents of this document are hereby incorporated by reference herein).

Figure 6:
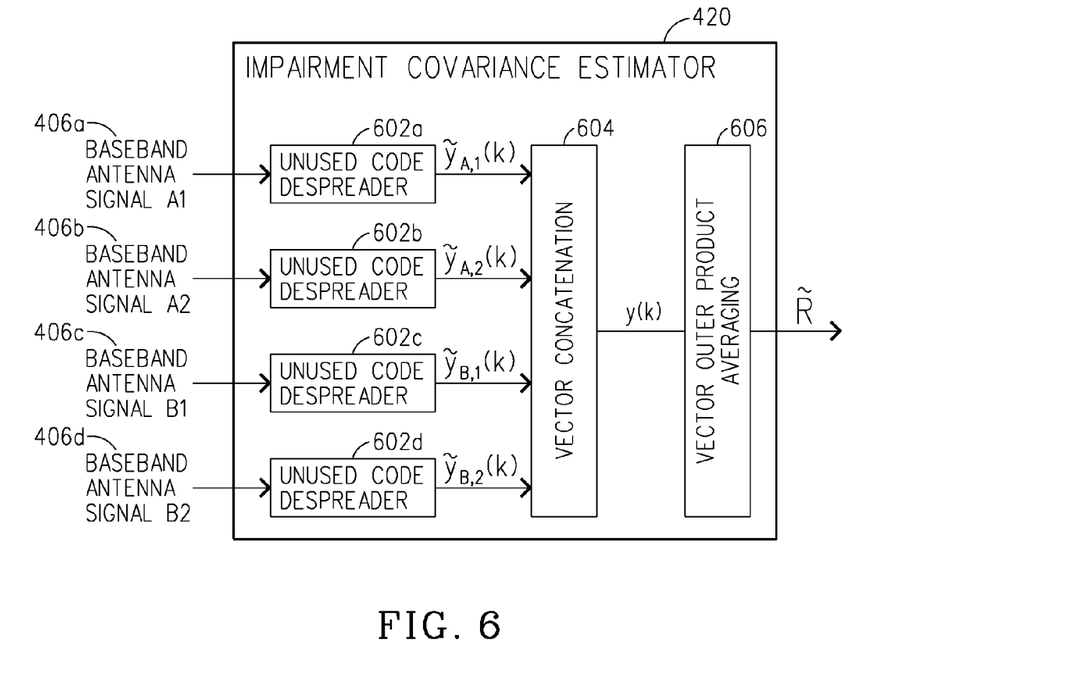

Referring to FIG. 6, there is a diagram which illustrates in greater detail the components of an exemplary impairment covariance matrix estimator 420 in accordance with an embodiment of the present invention. As shown, the impairment covariance matrix estimator 420 has unused code despreader units 602a, 602b, 602c and 602d which respectively receive the baseband antenna signals 406a, 406b, 406c and 406d and output unused code despread value vectors $\tilde{y}_{A.1}(k)$, $\tilde{y}_{A.2}(k)$, $\tilde{y}_{B.1}(k)$ and $\tilde{y}_{B.2}(k)$. A vector concatenation unit 604 collects all of the unused code despread vectors $\tilde{y}_{A.1}(k)$, $\tilde{y}_{A.2}(k)$, $\tilde{y}_{B.1}(k)$ and $\tilde{y}_{B.2}(k)$ and outputs $\tilde{y}(k)=[\tilde{y}_{A.1}^T(k), \tilde{y}_{A.2}^T(k), \tilde{y}_{B.1}^T(k), \tilde{y}_{B.2}^T(k)]^T$. A vector outer product averaging unit 606 receives the vector $\tilde{y}(k)$ and averages the outer product of vector $\tilde{y}(k)$ as follows:

$$\tilde{R} = \frac{1}{K}\sum_{k=0}^{K-1}\tilde{y}(k)\tilde{y}^H(k).$$

Note, the general notation $\tilde{y}_{i,j}(k)$ can be used to identify the unused code despread value vector (one element per finger delay) during the kth symbol period based on the baseband antenna signal from the jth receive antenna of sector i.

The G-Rake receiver 206 also has the channel estimator 418 which estimates a net response h for each user signal. The estimated net response h and the impairment covariance matrix R are both used by the combining weight calculator 416 to formulate the combining weight vector w (see equation $w=\tilde{R}^{-1}\tilde{h}$ and FIG. 4). According to the example of FIG. 2, the user signal 216d transmitted from user device 226d (for example) could be picked up by the two antennas 208a and 208b which are deployed in the first sector 210 and by the two antennas 212a and 212b which are deployed in the second sector 214 (see FIGS. 3A-3B). Then, each antenna signal 404a, 404b, 404c and 404d would be down-converted, filtered, and sampled, to produce a baseband antenna signal 406a, 406b, 406c and 406d. The channel estimator 418 then uses each baseband antenna signal 406a, 406b, 406c and 406d to produce a net response $\tilde{h}$ estimate for a signal of interest (e.g., user signal 226d). An exemplary channel estimator 418 is discussed next with respect to FIG. 7.

Figure 7:
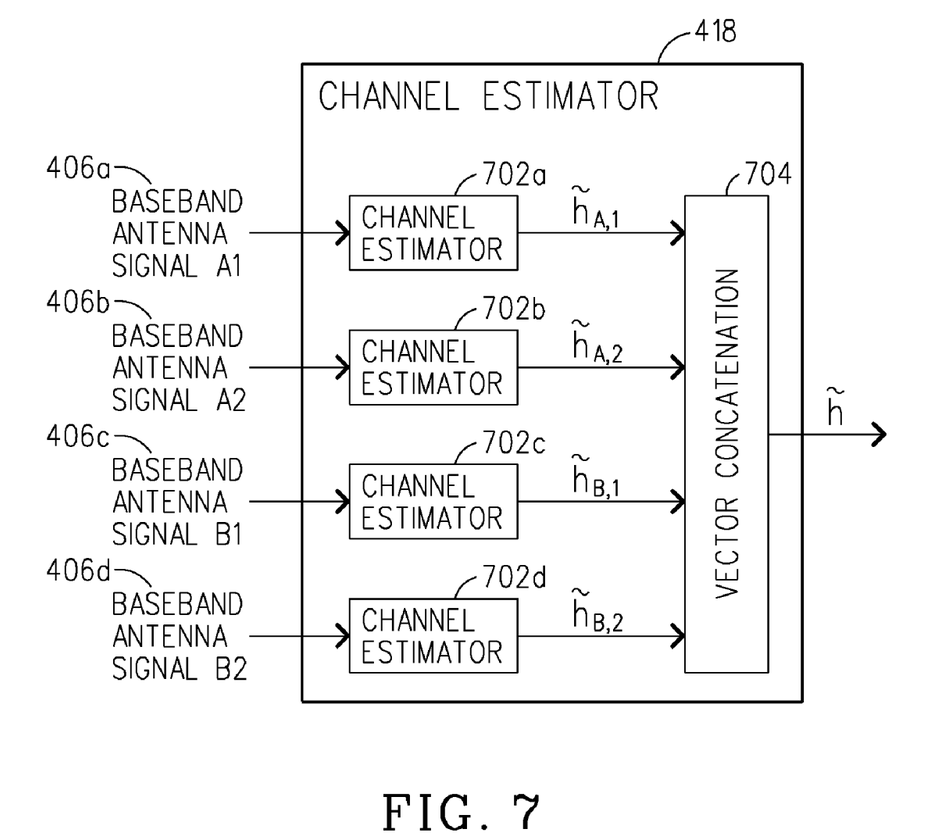

Referring to FIG. 7, there is a diagram which illustrates in greater detail the basic components of the channel estimator 418 in accordance with an embodiment of the present invention. As shown, the channel estimator 418 has multiple channel estimators 702a, 702b, 702c and 702d which respectively receive the baseband antenna signals 406a, 406b, 406c and 406d and output estimated net responses $\tilde{h}_{A.1}$, $\tilde{h}_{A.2}$, $\tilde{h}_{B.1}$ and $\tilde{h}_{B.2}$. A vector concatenation unit 704 collects the estimated net responses $\tilde{h}_{A.1}$, $\tilde{h}_{A.2}$, $\tilde{h}_{B.1}$ and $\tilde{h}_{B.2}$ and outputs $\tilde{h}=[\tilde{h}_{A.1}^T, \tilde{h}_{A.2}^T, \tilde{h}_{B.1}^T, \tilde{h}_{B.2}^T]^T$ where the superscript T denotes vector transpose. In one embodiment, the net response $\tilde{h}_{A.1}$, $\tilde{h}_{A.2}$, $\tilde{h}_{B.1}$ and $\tilde{h}_{B.2}$ corresponding to each antenna 208a, 208b, 212a and 212b could be obtained by correlating the antenna receive samples with the spreading codes used by pilot symbols. Note, the general notation $\tilde{h}_{i,j}$ is used to identify the estimated net response (one element per finger delay) which is associated with the jth receive antenna of a particular sector i. The G-Rake receiver 206 described herein only serves as an example since it is capable of processing multiple sectors (cells) antenna signals to determine the symbol estimates 414. Alternatively, other signal processors 220 or processing techniques may be employed to process multiple sectors (cells) antenna signals to determine the symbol estimates 414 per the present invention.

As discussed above, if the user device 216a (for example) is in a softer handoff mode then it can be assumed to be transmitting an uplink signal 226a which causes interference to the other user devices 216b, 216c and 216d which are located in the first and second sectors 210 and 214. The actual detection of stronger interfering signals from the user device 226a (for example) which is in a softer handoff mode can be performed in a number of ways. For instance, with a centralized approach, the symbol detector 204 for each signal in softer handoff can measure signal strength or noise-floor rise and threshold this quantity. Or, the data rate which is signaled in the uplink, can also be thresholded. The existence of a strong signal in softer handoff is then signaled to node 202 which then employs interference suppression softer combining to detect the symbols transmitted by user devices 216b, 216c, and 216d. Alternatively, the sectors 210 and 214 that the strong signal occupies can be signaled, so that the symbol detector 204 knows which sector antenna signals associated with other user signals to include in the interference suppression processing.

A distributed, blind approach can also be used. In this case, the symbol detector 204 estimates impairment correlations across antennas 208a, 208b, 212a and 212b from all sectors 210 and 214. Then, when a large correlation across antennas (i.e. spatial correlation) from different sectors is detected (via thresholding) those antenna signals are included for further processing per the present invention. For example, the largest magnitude correlation of antenna signals at a certain relative delay can be determined. This correlation can be normalized by dividing by the square-roots of the corresponding diagonal elements, giving a normalized value between 0 and 1. To avoid square roots, magnitude square values can be used. Thus, the magnitude-square crosscorrelation between antenna 1 delay 0 and antenna 2 delay 0 would be divided by the correlation of antenna 1 delay 0 with itself and antenna 2 delay 0 with itself.

In yet another approach, even when the interfering user device 216a (e.g., high-data-rate user device 216a) is not in softer handoff mode, if the base station 202 determines that the high-data-rate user signal 226a is picked-up by antennas 208a, 208b, 212a and 212b associated with multiple sectors 210 and 214 with good signal strength, then this can trigger the uplink softer interference combining for the other user devices 226b, 226c and 226d served by these sectors 210 and 214.

An advantage of the present invention is that it can be readily implemented in an existing base station since most of the existing base stations used today are already equipped with two receive antennas to cover a sector (cell). Thus, when a user device 216a (for example) is in softer handoff, its signal is received by four receive antennas 208a, 208b, 212a and 212b associated with two sectors 210 and 214 (cells 210 and 214). This enables the G-Rake4 reception to performed for other user devices 216b, 216c and 216d (for example) as described above in accordance with the present invention. It should be appreciated that the notation of softer handoff can further be generalized to multi-sector (multi-cell) signal processing. This is because regardless of whether the antennas are co-sited, the multiple antenna signals received by multiple sectors (cells) can be processed at a symbol detector 204 to recover a transmitted symbol in accordance with the present invention.

Another advantage of the present invention is that the symbol detector 204 has the ability to suppress dominant interferers whose signals with a relatively strong power level arrive at multiple sectors 210 and 214 of a base station 202. The proposed scheme also has advantages over a successive interference cancellation (SIC) scheme as follows:

1. The best performance of SIC is achieved by post-decoding cancellation where the receiver decodes the interfering signal, regenerates it, and then cancels it from the received signal. Such a process introduces a multi-slot delay to low-rate users. In contrast, the present symbol detector 204 has a very low latency which means that the G-Rake4 combining weight w can be formulated on a slot-by-slot basis.

2. The present invention is based on an extension of the softer combining provision and G-Rake combining principal, whereas SIC requires a major architecture revision. Thus, the present invention can be used as an interim solution in the event SIC is fully implemented in the existing and future base stations.

3. The present invention can also be used in combination with SIC where any leftover colored interference after SIC can be suppressed by the present invention.

Another advantage of the present invention is that the node 202 has a downlink operation that can be decoupled from the uplink softer combining operation. Thus, a user device 216d (for example) can be in a softer combining mode in the uplink, but not in soft handoff in the downlink. This means that the set of active cells can remain unchanged for this particular user device 216d (for example) and the additional sector antennas 208a and 208b (for example) can be viewed as an added degree of freedom to enhance interfering suppression. Plus, the newly involved sector 210 (for example) does not qualify it to be an "active cell".

Although multiple embodiments of the present invention has been illustrated in the accompanying Drawings and described in the foregoing Detailed Description, it should be understood that the invention is not limited to the disclosed embodiments, but instead is also capable of numerous rearrangements, modifications and substitutions without departing from the spirit of the invention as set forth and defined by the following claims.

The invention claimed is:

1. A node adapted to suppress interference between user devices, said node comprising:
a symbol detector that comprises:
a receiver coupled to at least one receive antenna which covers the first sector and at least one receive antenna which cover the second sector; and
a signal processor that:
processes composite receive signals received by the at least one receive antenna which covers the first sector and the at least one receive antenna which covers the second sector, said composite receive signals each comprising a first user signal transmitted from a first user device and a second user signal transmitted from a second user device;
determines if the first user signal causes interference to the second user signal received in either or both of the first sector and the second sector; and if the first user signal does cause interference to the second user signal, then the second user signal is recovered by processing the composite signals to form symbol estimates.

2. The node of claim 1, wherein the at least one receive antenna which covers the first sector and the at least one receive antenna which covers the second sector are deployed at the same site.

3. The node of claim 1, wherein the at least one receive antenna which covers the first sector and the at least one receive antenna which covers the second sector are deployed at different sites.

4. The node of claim 1, wherein said signal processor processes the composite signals to form the symbol estimates and recover the second user signal further by processing the received signal associated with the at least one antenna which covers the first sector and the at least one antenna which covers the second sector to form one of baseband values and despread values and combining the resultant values using a set of combining weights.

5. The node of claim 4, wherein the combining weights account for impairment correlations that occur between the at least one receive antenna which covers the first sector and the at least one receive antenna which covers the second sector.

6. The node of claim 1, wherein said signal processor processes the composite signals to form the symbol estimates and recover the second user signal further by using a softer handoff combining technique.

7. The node of claim 1, wherein said signal processor determines the first user signal causes interference to the second user signal if the first user device is in a soft or softer handoff mode.

8. The node of claim 1, wherein said signal processor determines the first user signal causes interference to the second user signal if the first user device transmits the first user signal which has a threshold parameter and which was received by the at least one receive antenna which covers the first sector and the at least one receive antenna which covers the second sector.

9. The node of claim 1, wherein said signal processor determines the first user signal causes interference to the second user signal if impairment correlations indicate there is a threshold correlation across the at least one receive antenna which covers the first sector and the at least one receive antenna which covers the second sector.

10. The node of claim 1, wherein said signal processor recovers the second user signal by having the second user device in a softer handoff mode for uplink transmissions but not having the second user device in the softer handoff mode for downlink transmissions.

11. A method for suppressing interference, said method comprising the steps of:
processing composite receive signals which are received by at least one receive antenna which covers a first sector and at least one receive antenna which covers a second sector, said composite receive signals each comprising a first user signal transmitted from a first user device and a second user signal transmitted from a second user device;
determining if the first user signal causes interference to the second user signal received in either or both of the first sector and the second sector; and
if the first user signal does cause interference to the second user signal, then recovering the second user signal by processing the composite signals to form symbol estimates.

12. The method of claim 11, wherein the at least one receive antenna which covers the first sector and the at least one receive antenna which covers the second sector are deployed at the same site.

13. The method of claim 11, wherein the at least one receive antenna which covers the first sector and the at least one receive antenna which covers the second sector are deployed at different locations.

14. The method of claim 11, wherein the composite signals are processed to form the symbol estimates and the recovering of the second user signal further includes processing the received signal associated with the at least one antenna which covers the first sector and the at least one antenna which covers the second sector to form one of baseband values and despread values and combining the resultant values using a set of combining weights.

15. The method of claim 14, wherein the combining weights account for impairment correlations that occur between the at least one receive antenna which covers the first sector and the at least one receive antenna which covers the second sector.

16. The method of claim 11, wherein said recovering step further includes using a softer interference combining technique.

17. The method of claim 11, wherein said determining step further includes determining the first user signal causes interference to the second user signal if the first user device is in a soft handoff mode.

18. The method of claim 11, wherein said determining step further includes determining the first user signal causes interference to the second user signal if the first user device transmits the first user signal which has a threshold parameter and which was received by the at least one receive antenna which covers the first sector and the at least one receive antenna which covers the second sector.

19. The method of claim 11, wherein said determining step further includes determining if impairment correlations indicate there is a threshold correlation across the at least one receive antenna which covers the first sector and the at least one receive antenna which covers the second sector.

20. The method of claim 11, wherein said recovering step further includes having the second user device in a softer handoff mode for uplink transmissions but not having the second user device in the softer handoff mode for downlink transmissions.

* * * * *

UNITED STATES PATENT AND TRADEMARK OFFICE
CERTIFICATE OF CORRECTION

| | | |
|---|---|---|
| PATENT NO. | : 8,000,655 B2 | Page 1 of 1 |
| APPLICATION NO. | : 12/339967 | |
| DATED | : August 16, 2011 | |
| INVENTOR(S) | : Wang et al. | |

It is certified that error appears in the above-identified patent and that said Letters Patent is hereby corrected as shown below:

In Column 5, Line 15, delete "desperado" and insert -- despreader --, therefor.

Signed and Sealed this
Twenty-seventh Day of December, 2011

David J. Kappos
*Director of the United States Patent and Trademark Office*